(12) United States Patent
Ragnvid

(10) Patent No.: US 11,785,895 B2
(45) Date of Patent: Oct. 17, 2023

(54) PLANT CARRIER

(71) Applicant: BJÖRKEMAR CONSTRUCTION & CONSULTING BCC AB, Landskrona (SE)

(72) Inventor: Tobias Ragnvid, Strövelstorp (SE)

(73) Assignee: BJÖRKEMAR CONSTRUCTION & CONSULTING BCC AB, Landskrona (SE)

( * ) Notice: Subject to any disclaimer, the term of this patent is extended or adjusted under 35 U.S.C. 154(b) by 315 days.

(21) Appl. No.: 17/309,490

(22) PCT Filed: Dec. 3, 2018

(86) PCT No.: PCT/SE2018/051238
§ 371 (c)(1),
(2) Date: Jun. 1, 2021

(87) PCT Pub. No.: WO2020/117104
PCT Pub. Date: Jun. 11, 2020

(65) Prior Publication Data
US 2022/0053709 A1    Feb. 24, 2022

(51) Int. Cl.
*A01G 9/029*    (2018.01)
(52) U.S. Cl.
CPC .................................. *A01G 9/0295* (2018.02)
(58) Field of Classification Search
CPC .. A01G 9/0295; A01G 9/0297; A01G 9/0293; A01G 9/029; A01G 9/027; A01G 9/028; A01G 9/02
See application file for complete search history.

(56) References Cited

U.S. PATENT DOCUMENTS 6,266,919 B1 * 7/2001 Hoium, Jr. ............. A01G 9/028
                                                        206/510
6,266,921 B1 * 7/2001 Keskilohko .......... A01G 9/0295
                                                        47/87
(Continued)

FOREIGN PATENT DOCUMENTS

AU    2004201547 A1    1/2005
CN      205336989 U     6/2016
(Continued)

OTHER PUBLICATIONS

International Preliminary Report on Patentability for PCT Application No. PCT/SE2018/051238, dated Feb. 18, 2021, 16 pages.
(Continued)

*Primary Examiner* — Kristen C Hayes
(74) *Attorney, Agent, or Firm* — Brake Hughes Bellermann LLP

(57) ABSTRACT

A plant propagation cell carrier (1) having a frame (2) with plant cell compartments (3) for receiving a plant cell of fibrous web material, wherein each plant cell compartment has opposing pairs of side walls (5, 6; 7, 8) forming an essentially open upper end (2A) and a partly open bottom end (3B) of the plant cell compartments (3), whereby the plant cell compartments consist of a plant cell basket (10) having side walls each being a continuation of the opposing side walls of the plant cell compartments (3) and each of the side walls of the plant cell baskets is formed of a number of spaced slender ribs (9) extending from an upper end (3A) of the plant cell baskets to the bottom end (3B) of the plant cell baskets of the plant cell compartments and whereby completely open areas (11, 12) are formed in the plant cell baskets, between the adjacent ribs and in corner areas (13) of the plant cell baskets.

20 Claims, 5 Drawing Sheets

(56) References Cited

U.S. PATENT DOCUMENTS

| | | | |
|---|---|---|---|
| 8,474,180 B2 | 7/2013 | Berk et al. | |
| 9,706,718 B1* | 7/2017 | McMillan | A01G 9/086 |
| 2014/0165467 A1* | 6/2014 | DeYoung | A01G 9/045 47/87 |
| 2016/0174469 A1* | 6/2016 | Shaffer | A01G 9/0291 47/65.5 |
| 2021/0029893 A1* | 2/2021 | Cooley | A01G 9/027 |
| 2021/0267134 A1* | 9/2021 | Cooley | A01G 9/0293 |

FOREIGN PATENT DOCUMENTS

| | | |
|---|---|---|
| EP | 1593302 A1 | 11/2005 |
| JP | 2008092828 A | 4/2008 |
| WO | 2010103276 A1 | 9/2010 |
| WO | 2013019105 A2 | 2/2013 |
| WO | 2017044017 A1 | 3/2017 |

OTHER PUBLICATIONS

International Search Report for PCT Application No. PCT/SE2018/051238, dated Jul. 3, 2019, 4 pages.
Supplementary European Search Report for Application No. EP18941971, dated Jun. 3, 2022, 3 pages.

\* cited by examiner

A-A

PLANT CARRIER

CROSS-REFERENCE TO RELATED APPLICATION

This application is a 35 U.S.C. § 371 National Phase Entry Application from PCT/SE2018/051238, filed on Dec. 3, 2018, entitled "PLANT CARRIER", the disclosure of which is incorporated by reference herein in its entirety.

TECHNICAL FIELD

The present technology generally concerns the propagation of plants in individual compartments in a plant carrier often referred to as a tray and specifically relates to the configuration of such a plant propagation carrier/tray and especially of its individual compartments.

BACKGROUND

In recent years there has been a development within areas of the plant propagation field towards the propagation of plants in "cells" made of fibrous material, such as special paper quality. Such cells of fibrous material, henceforth named plant propagation cells, or simply fiber cells, are used instead of the traditional plastic cells that for a long time have been used in several different plant handling and transporting systems, such as those used for the growing of seedlings and cuttings in e.g. forest nurseries. In order to securely support the plants and fiber cells they are normally supported in a plastic carrier having compartments that to a certain extent resemble the plastic cells of the traditional plant propagation trays. The existing systems using such fiber/paper cell and plastic tray combinations are mostly but not exclusively used in nurseries for propagating vegetable plants and flowers.

There has been an ongoing development with the aim of improving fiber material qualities for the plant propagation cells as well as of the actual fiber cells formed therefrom. An example of such a development regarding the optimization of plant carrier plant cell compartments is disclosed in Applicants own earlier International Patent Application WO2017044017 A1. This document has an explicit object of suggesting technology that will allow for an easy and space saving stacking of carriers on top of each other, while at the same time providing adequate ventilation and maintaining appropriate root guiding Despite the many proposed developments concerning the fiber cell carrier trays in general and their fiber cell carrier compartments in specific, there is still a demand for further improvements, not least as regards the fiber cell carriers and the design and configuration of their individual, fiber cell carrying compartments. A general desire is to optimize the plant carrier plant cell compartment configuration to enable effective growing conditions for the plants and their roots.

SUMMARY

It is a general object to provide an improved solution satisfying the above discussed requirements and demands. In particular it is an object to suggest an improved fiber cell plant carrier with fiber cell compartments configured to provide optimized plant propagation conditions.

These and other objects are met by the technology as defined by the accompanying claims. According to the technology, there is provided a plant propagation fiber cell carrier having a frame with plant propagation cell compartments for each receiving a plant propagation cell manufactured from fibrous web material, wherein each plant propagation cell compartment consists of a fiber cell basket that has side walls forming an essentially open upper end and a partly open bottom end. In a basic configuration each of the side walls of the fiber cell baskets is formed of a number of spaced slender ribs extending from the upper end to the bottom end and in that in the fiber cell baskets are formed completely open areas between the adjacent ribs and in corner areas of the fiber cell baskets.

Thereby is enabled maximum contact between the fiber cells and ambient air surrounding the cells, hence minimizing or totally excluding the presence of micro climate at the fiber cells.

Preferred further developments of the basic idea as well as a preferred embodiment thereof are specified in the dependent subclaims and advantages offered by the present technology in addition to those described above will be appreciated upon reading the below detailed description of embodiments of the technology.

BRIEF DESCRIPTION OF THE DRAWINGS

The technology and its objects and advantages will be best understood by reference to the following description taken together with the accompanying drawings, in which.

DETAILED DESCRIPTION

The technology will now be described in connection with an exemplifying embodiment of a plant cell carrier that is explained with reference to partly schematical illustrations in the accompanying drawing figures. The embodiment serves to exemplify the use of the principles of the new technology in an application for the propagation of plants in various environments. It shall be emphasized though that the illustrations and the specification serve the purpose of explaining preferred embodiments of the technology and are not intended to limit the technology to details or to any specific field of application thereof. The presently proposed solutions may thus with only minor adaption be applied to most types of plant propagation facilities. It shall also be emphasized from the start that the use throughout the specification and claims of the terms "propagation", "plant" and "nurseries" shall not limit the technology to any specific type of plant handling. Thus, such terms as used herein shall include any type of plant propagation within as well as outside of nurseries.

Figure 2:
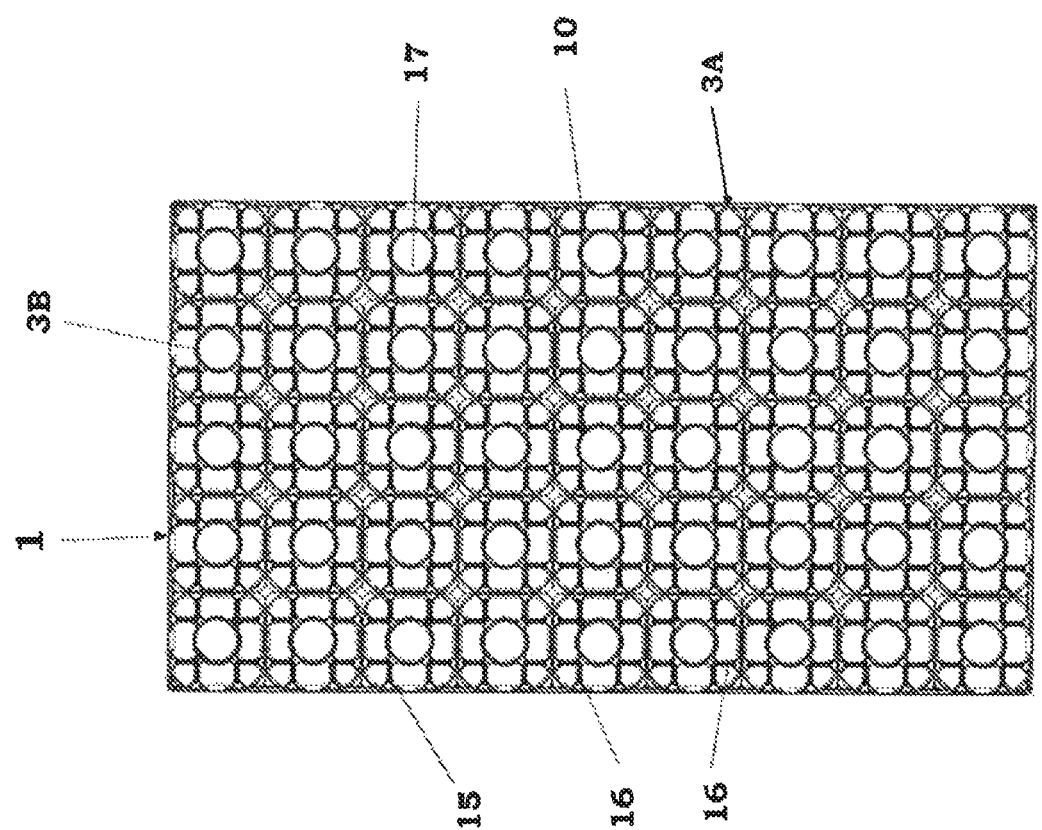
FIG. 2 is a bottom view of the fiber cell carrier of the present technology.
Figure 1:
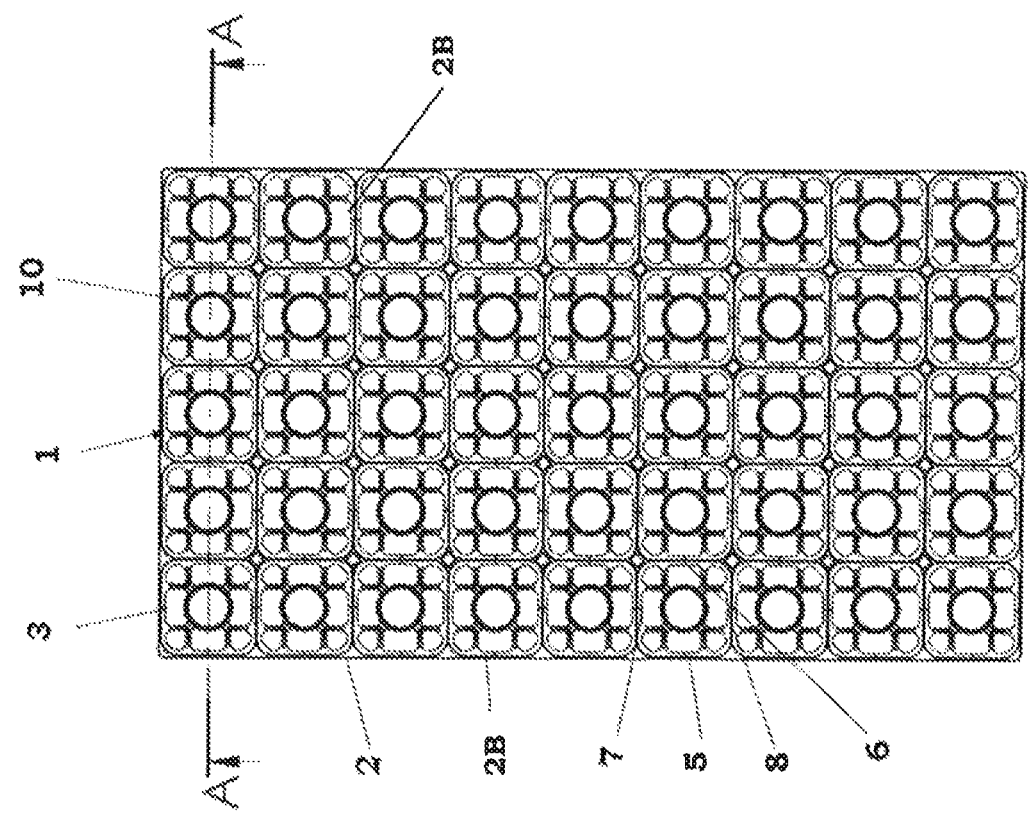
FIG. 1 is a top view of the fiber cell carrier of the present technology.
Figure 3A:
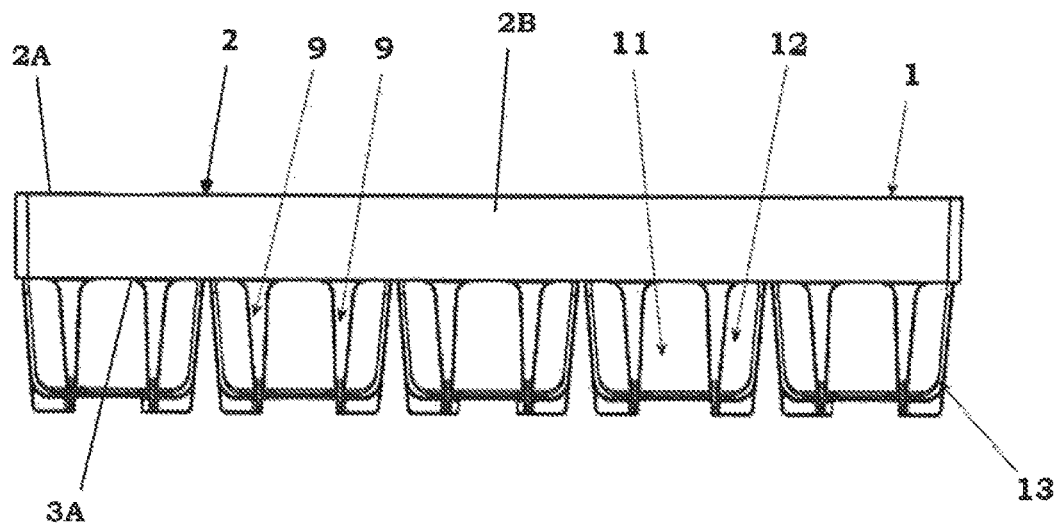
FIG. 3A is an end view of the fiber cell carrier of FIG. 1.
Figure 3B:
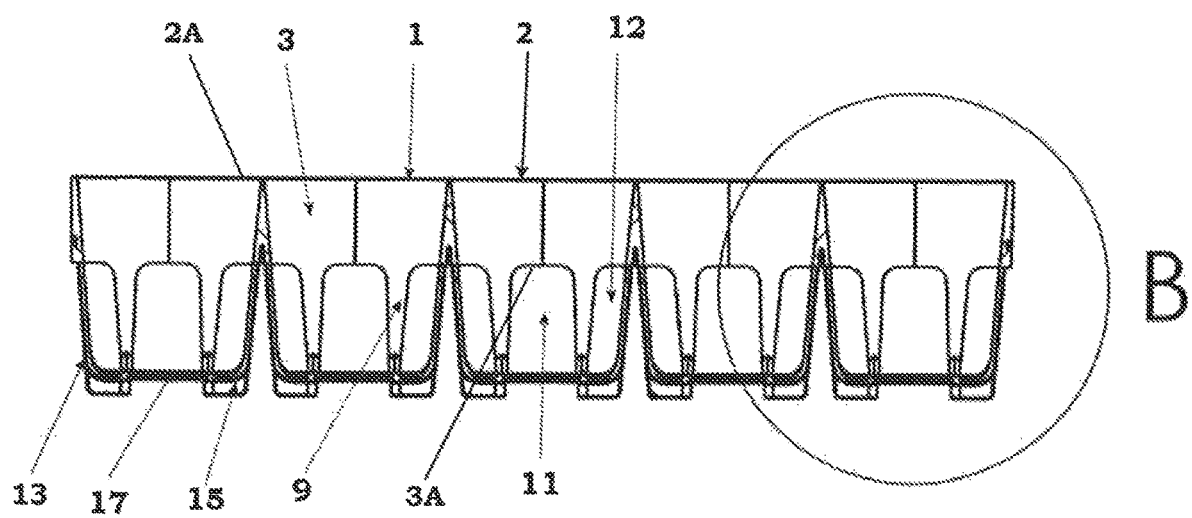
FIG. 3B is a cross section view along line A-A of the fiber cell carrier of FIG. 1.
Figure 4:
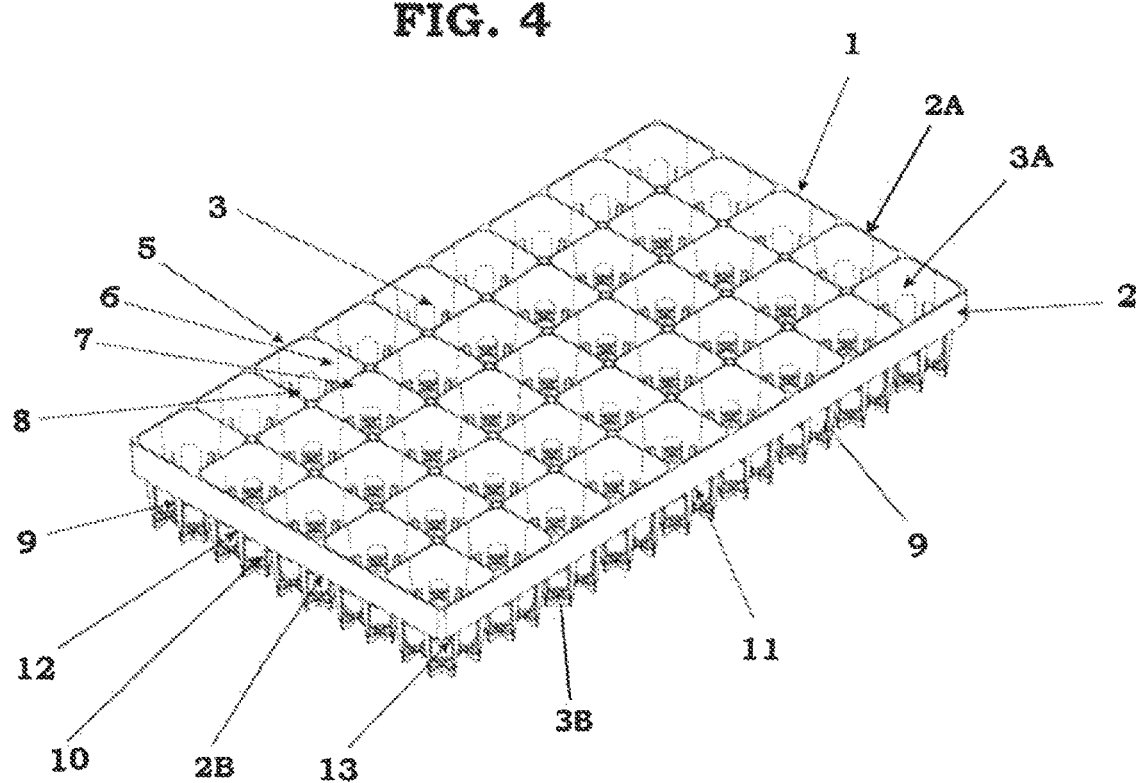
FIG. 4 is a top perspective view of the fiber cell carrier of FIG. 1.
Figure 5:
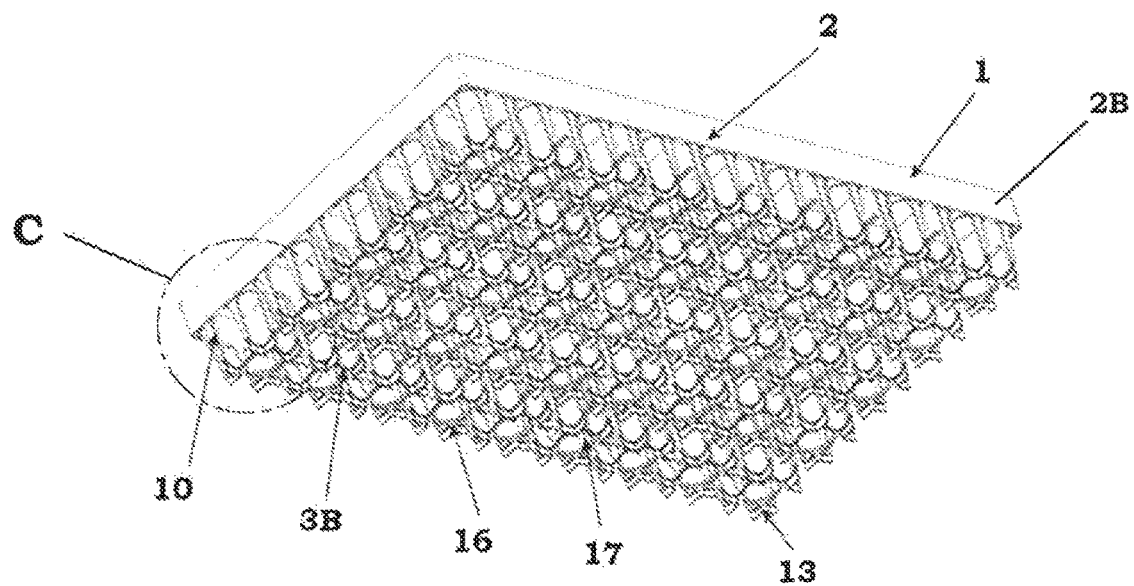
FIG. 5 is a bottom perspective view of the fiber cell carrier of FIG. 1.
Figure 6:
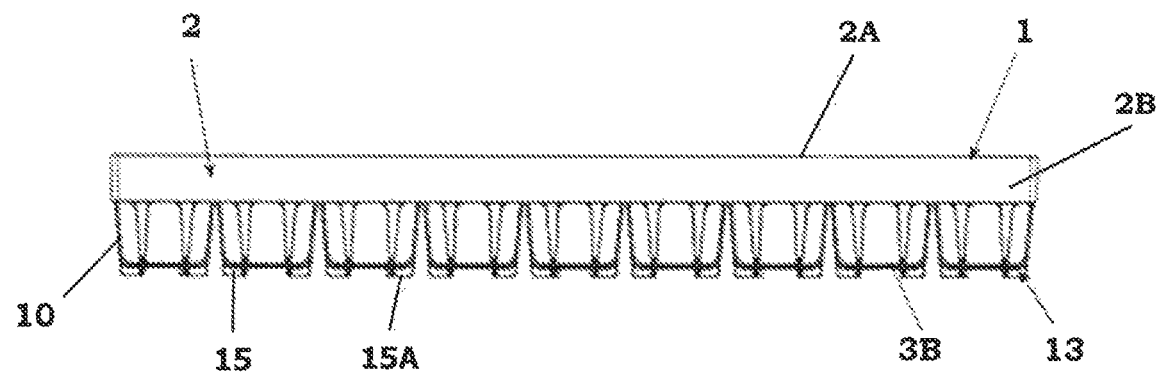
FIG. 6 is a side view of the fiber cell carrier of FIG. 1.
Figure 7:
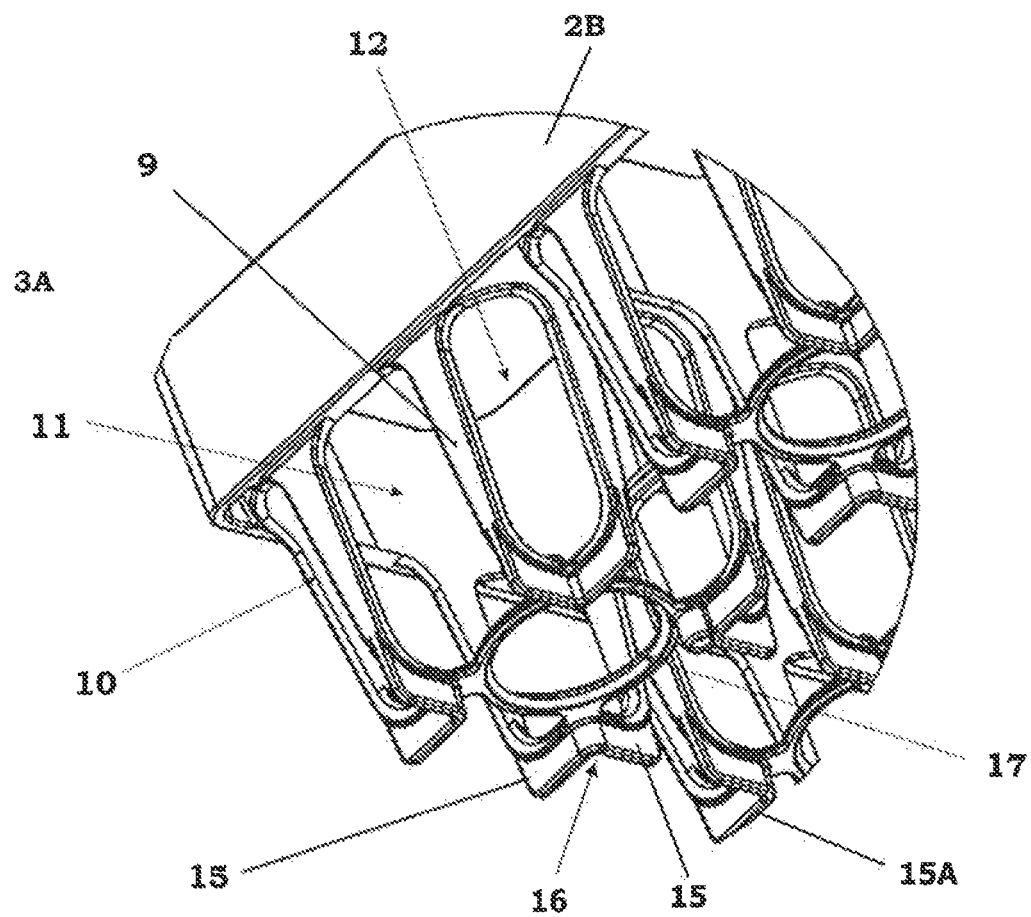
FIG. 7 is an enlarged perspective view illustrating the configuration of a fiber cell receiving compartment basket in the area C of the plant propagation cell carrier of FIG. 5.
Figure 8:
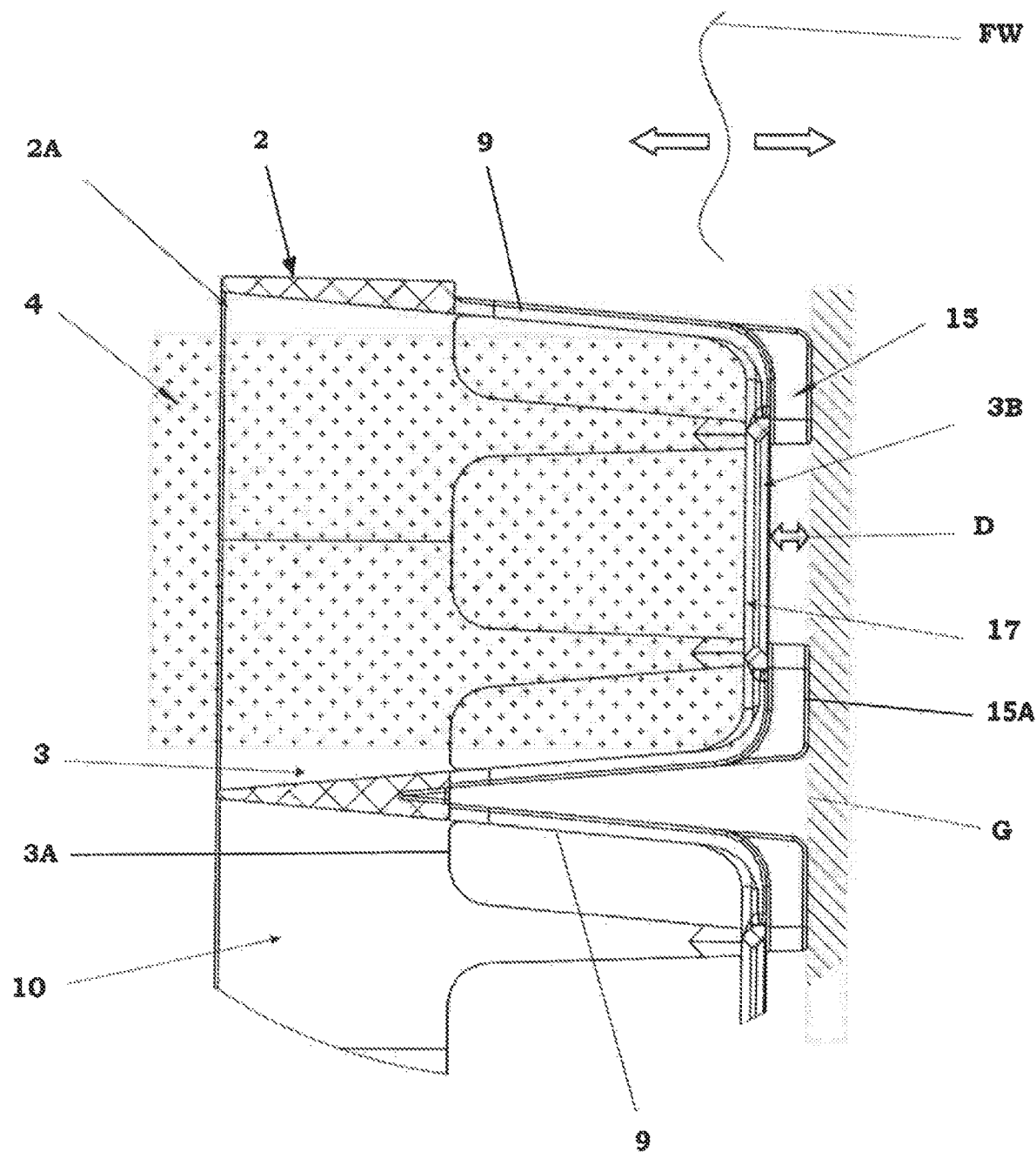
FIG. 8 is an explanatory partial cross section through the area B of the plant propagation cell carrier of FIG. 3B.

The new technology will now be specifically explained below with reference to an exemplifying, partly schematical embodiment of a carrier for supporting fibrous web material plant cells. In the accompanying FIGS. 1-8 is outlined an embodiment of such a plant propagation cell carrier 1 configured in accordance with the presently proposed technology. This embodiment of the present technology relates to an application of the technology to a plant propagation cell carrier intended for use for e.g. crops grown with hydro pond technology (Flood and tide system). However, it is emphasized that the present technology may also be equally well suited for application to other environments and for other types of plant propagation cell carriers in other plant propagation systems. It is therefore emphasized that the illustrations are provided for the sole purpose of describing a preferred embodiment and are not intended to limit the technology to details or to any specific field of application.

The plant propagation cell carrier 1 that is illustrated in FIGS. 1-8 is therefore only given as an example of an environment where the present technology may be applied. It shall be realized that the disclosure covers the incorporation of features related to other applications and any combination of features disclosed herein. As was discussed above, previous solutions for propagating plants in fiber material cells supported in carriers have all been only partially successful and have thus not succeeded in optimizing the plant carrier configuration to enable effective growing conditions for the plants and their roots for various environments.

To overcome shortcomings and disadvantages in connection with the operation of known fiber material plant propagation cell carriers and systems, the present technology suggests a novel approach for optimizing the plant cell carrier configuration. This is done by further developing a plant propagation cell carrier 1 having a frame 2 with plant cell compartments 3 for each receiving a plant cell 4 manufactured from fibrous web material, a fiber plant cell. Each plant cell compartment 3 has opposing pairs of side walls 5, 6, 7, 8 forming an essentially open upper end 2A of the frame 2 and a partly open bottom end 3B of a later described plant cell basket 10. As described so far the plant propagation cell carrier 1 is quite conventional. However, as illustrated in FIGS. 1, 2, 3A and 3B the present technology suggests that the plant cell compartments 3 consist of a plant cell basket 10 having side walls each being a continuation of the opposing side walls of the compartments 3. Each plant cell basket 10 side wall is formed by a number of spaced slender ribs 9 extending from a fully open upper end 3A of the basket 10 to the bottom end 3B of the plant cell compartments 3 and thereby of the plant cell baskets 10. Thereby, the plant cell baskets 10 are formed with completely open areas 11, 12 between the adjacent ribs 9 and in corner areas 13 of the plant cell baskets.

The essentially open upper end 3A of each plant cell basket 10 is preferably joined to an upper rim 2B of the essentially open upper end 2A of the frame 2 of the plant propagation cell carrier 1. Said rim 2B of the frame 2 extends around the entire perimeter of the plant propagation cell carrier 1 and around the upper end 2A of each plant cell compartment 3. The partly open bottom end 3B of each plant cell basket 10 is formed by a ring-shaped support 17 that is joined to all of later described angular combined spacer formations 16.

The disclosed configuration provides several essential advantages by enabling a much more open basket design that will allow maximum contact between the fiber plant cells 4 and ambient air surrounding the fiber cells 4, hence minimizing or totally excluding the presence of micro climate at the fiber cells 4. With the presently proposed carrier configuration crops grown with hydro pond technology (Flood and tide system) will be drained and dried out better when tide is present. In such crop systems root systems are repeatedly watered and dried out and are thus stimulated better so that roots and plants grow sturdier.

In the disclosed embodiment each of the side walls of the plant cell baskets 10 is formed of two spaced slender ribs 9. Thereby, each completely open area 11, 12 formed between the spaced slender ribs 9 and at the corner areas 13 of each plant cell basket 10 preferably extends uninterrupted from the partly open bottom end 3B thereof and up to the essentially open upper end 3A thereof.

In accordance with a further suggested development of the plant propagation cell carrier 1 spacers 15 are formed extending downwardly past the partly open bottom end 3B of each plant cell basket 10, thereby securing a distance D between said bottom end 3B of each plant cell basket 10 and a ground level plane G. This ground level plane G is formed by a lower end surface 15A of each spacer 15, on which the plant cell baskets 10 are intended to be supported, thereby allowing air to flow under the plant propagation cell carrier 1. The spacers 15 are preferably formed as lower continuations of each of the spaced slender ribs 9 and in a further development the spacers 15 of two adjacent ribs 9 may meet and may be joined to each other to form an angular combined spacer formation 16.

Thus the distance D formed between the ground level G and the fiber cell bottom 3B allows air to flow under the fiber cell 4 and prevent continued contact with water residues when tide is present. On the other hand, during flood the suggested open basket 10 design allows water to flow freely around and to come in contact with the fiber cell 4, providing faster watering with minimum micro climate at the fiber cell 4.

In further preferred developments of the plant propagation cell carrier 1 according to this new technology the angular combined spacer formations 16 are each formed at the corner areas 13 of each plant cell basket 10 by the joined spacers 15 of two adjacent ribs 9 positioned on either side of said corner areas 13. The spaced slender ribs 9 are illustrated having a slightly tapered shape from the essentially open upper end 3A of the plant cell basket 10 and towards the partly open bottom end 3B thereof.

The present technology has been described in connection with an embodiment that is to be regarded as an illustrative example thereof. It will be understood by those skilled in the art that the present technology is not limited to the disclosed embodiment but is intended to cover various modifications and equivalent arrangements. The present technology likewise covers any feasible combination of features described and illustrated herein. The scope of the present technology is defined by the appended claims.

The invention claimed is:

1. A plant propagation cell carrier, comprising:
a frame defining plant cell compartments for each receiving a plant cell made from fibrous web material, wherein each plant cell compartment has opposing pairs of side walls forming an essentially open upper end and a partly open bottom end of the respective plant cell compartment;
a plant cell basket having side walls each being a continuation of the opposing side walls of the plant cell compartments, with each of the side walls of the plant cell baskets being formed of a number of spaced slender ribs extending from an upper end of the plant cell baskets to the bottom end of the plant cell baskets, and the plant cell baskets being formed with completely open areas between adjacent ribs of the number of spaced slender ribs and in corner areas of the plant cell baskets, thereby providing for contact between the plant cells and ambient air surrounding the cells, and inhibiting a micro climate at the cell; and spacers extending downwardly past the partly open bottom end of each plant cell basket, thereby securing a distance between said bottom end of each plant cell basket and a ground level plane formed by a lower end surface of each spacer and on which the plant cell baskets are configured to be supported, thereby allowing air to flow under the plant propagation cell carrier, wherein each of the opposing side walls of the plant cell baskets is formed of two spaced slender ribs.

2. The plant propagation cell carrier according to claim 1, wherein each completely open area formed between the spaced slender ribs and at the corner areas of each plant cell basket extends uninterrupted from the partly open bottom end thereof and up to the essentially open upper end thereof.

3. The plant propagation cell carrier according to claim 2, wherein the spacers are formed as lower continuations of each of the spaced slender ribs.

4. The plant propagation cell carrier according to claim 3, wherein the spacers of two adjacent ribs meet and are joined to each other to form an angular combined spacer formation.

5. The plant propagation cell carrier according to claim 3, wherein the spaced slender ribs have a tapered shape from the essentially open upper end of the plant cell basket and towards the partly open bottom end thereof.

6. The plant propagation cell carrier according to claim 2, wherein the spacers of two adjacent ribs meet and are joined to each other to form an angular combined spacer formation.

7. The plant propagation cell carrier according to claim 6, wherein the angular combined spacer formations are each formed at the corner areas of each plant cell basket by the joined spacers of two adjacent ribs positioned on either side of said corner areas.

8. The plant propagation cell carrier according to claim 2, wherein the spaced slender ribs have a tapered shape from the essentially open upper end of the plant cell basket and towards the partly open bottom end thereof.

9. The plant propagation cell carrier according to claim 1, wherein the spacers are formed as lower continuations of each of the spaced slender ribs.

10. The plant propagation cell carrier according to claim 9, wherein the spacers of two adjacent ribs meet and are joined to each other to form an angular combined spacer formation.

11. The plant propagation cell carrier according to claim 10, wherein the angular combined spacer formations are each formed at the corner areas of each plant cell basket by the joined spacers of two adjacent ribs positioned on either side of said corner areas.

12. The plant propagation cell carrier according to claim 9, wherein the spaced slender ribs have a tapered shape from the essentially open upper end of the plant cell basket and towards the partly open bottom end thereof.

13. The plant propagation cell carrier according to claim 1, wherein the spacers of two adjacent ribs meet and are joined to each other to form an angular combined spacer formation.

14. The plant propagation cell carrier according to claim 13, wherein the partly open bottom end of each plant cell basket is formed by a ring-shaped support that is joined to all of the angular combined spacer formations.

15. The plant propagation cell carrier according to claim 13, wherein the spaced slender ribs have a tapered shape from the essentially open upper end of the plant cell basket and towards the partly open bottom end thereof.

16. The plant propagation cell carrier according to claim 13, wherein the angular combined spacer formations are each formed at the corner areas of each plant cell basket by the joined spacers of two adjacent ribs positioned on either side of said corner areas.

17. The plant propagation cell carrier according to claim 1, wherein angular combined spacer formations are formed at the corner areas of each plant cell basket by the joined spacers of two adjacent ribs positioned on either side of said corner areas.

18. The plant propagation cell carrier according to claim 17, wherein the spaced slender ribs have a slightly tapered shape from the essentially open upper end of the plant cell basket and towards the partly open bottom end thereof.

19. The plant propagation cell carrier according to claim 1, wherein the spaced slender ribs have a tapered shape from the essentially open upper end of the plant cell basket and towards the partly open bottom end thereof.

20. The plant propagation cell carrier according to claim 1, wherein the essentially open upper end of each plant cell basket is joined to an upper rim of the frame extending around an entire perimeter of the plant propagation cell carrier.

\* \* \* \* \*